(12) United States Patent
Bera

(10) Patent No.: US 6,658,643 B1
(45) Date of Patent: Dec. 2, 2003

(54) METHOD AND APPARATUS FOR COMPUTER SOFTWARE ANALYSIS

(75) Inventor: Rajendra Kumar Bera, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 518 days.

(21) Appl. No.: 09/644,119

(22) Filed: Aug. 23, 2000

(51) Int. Cl.7 .............................. G06F 9/44; G06F 9/45
(52) U.S. Cl. ....................................... 717/101; 717/141
(58) Field of Search ........................... 717/101–103, 717/120–123, 140–143

(56) References Cited

U.S. PATENT DOCUMENTS

| | | | | |
|---|---|---|---|---|
| 5,729,746 A | * | 3/1998 | Leonard ...................... | 717/101 |
| 5,930,798 A | * | 7/1999 | Lawler et al. ............... | 717/104 |
| 5,960,196 A | * | 9/1999 | Carrier et al. .............. | 717/122 |
| 6,073,107 A | * | 6/2000 | Minkiewicz et al. .......... | 705/7 |
| 6,199,193 B1 | * | 3/2001 | Oyagi et al. ................ | 717/101 |
| 6,513,154 B1 | * | 1/2003 | Porterfield .................. | 717/101 |

* cited by examiner

*Primary Examiner*—Tuan Q. Dam
*Assistant Examiner*—Eric B. Kiss
(74) *Attorney, Agent, or Firm*—Manny W. Schecter; T. Rao Coca; Anthony V. S. England

(57) ABSTRACT

A method and system for analysing software to estimate the cost of production, development and maintenance of computer applications. Unlike previous proposals for such analysis, where the primary measured parameters are the numbers of lines of code and function points, the inventive method identifies high complexity software segments arising from specific discontinuities in execution of the program, ie points at which the program has to, in effect, make decisions. These items are assigned complexity indices which may be summed to give an overall complexity value for the program or the indices may be displayed as a histogram showing the complexity distribution of the program.

8 Claims, 1 Drawing Sheet

METHOD AND APPARATUS FOR COMPUTER SOFTWARE ANALYSIS

FIELD OF THE INVENTION

This invention relates to the analysis of computer software, including the source code and pre-coding documentation such as program designs, in order to estimate the cost of production, development and maintenance of the relevant computer programs. The analysis can also be directed to the tracking of progress in a particular software project, optimal assignment of labour to such tasks and, in some cases, to optimisation of the software design itself. The invention relates to a method and apparatus for analysing a computer program or a part thereof, and also to a computer program product including a computer readable medium having recorded thereon a computer program for performing such analysis.

BACKGROUND

Making accurate cost estimates for software development, enhancement, testing, etc is necessary for a vendor to remain profitable in the market. As noted by Fairly, R, in Software Engineering Concepts, McGraw-Hill Book Co, New York, 1985, page 64 and pages 72–75, estimating the cost of a software product is one of the most difficult and error-prone tasks in software engineering especially during the planning phase.

To ease the task, certain software cost estimation models have been provided, for example the COCOMO 2.0 Software Cost Estimation Model, disclosed by B Boehm et al in American Programmer, July 1996, pages 2–17. COCOMO 2.0 comprises a tailorable family of software sizing models, involving object points, function points and source lines of code; non-linear models for software reuse and reengineering; and an exponent-driver approach for modelling relative software diseconomies of scale. Even so, cost estimates (or effort estimates) remain difficult to make because some (or all) of the measures and parameters chosen to define them lack universal agreement as to what they mean and how they are to be measured. For example, two of the frequently used parameters—the number of lines of code and function points in a software product—are open to the personal interpretation of individuals, which can then lead to widely varying estimates being produced between any two individuals, or even the same individual making the estimates at different times. When shorn of jargon and high flying phrases, available estimation techniques are sometimes no better than educated guesses made by an individual.

The object of the invention is to at least partly remedy this situation by providing a measurement system comprising a consistent and repeatable measure of complexity in software codes. This is achieved by defining and providing measures for two of the central notions of the measurement system—decision points and complexity index.

SUMMARY OF THE INVENTION

The present invention provides a method for determining the complexity of a computer program in which, from the program source code or other pre-coding documentation, such as, the program design, the actual or expected presence of certain predetermined items in the program is determined. These items are specifically those that are indicative of breaks in the ongoing forward flow of the program. These items are for example conditional statements, loops, memory allocations, subroutine calls, etc which break the linear flow of code and/or the linear flow of thought and which therefore need careful attention during coding. For example, the code portion that results in the break may need to be examined to see if the flow has been coded as intended, if return values of function calls have been handled correctly, whether memory leaks have been avoided, etc. Breaks in flow (of code and thought) are considered complex because there is a need to pause and reflect upon the change that is being made and the course of action that is being selected.

By contrast, the presence of a large but simple block of statements in a program is tedious but not complex since the block can be scanned sequentially from beginning to end without worrying about breaks in the logical (implicit or explicit) flow in the lines of code. Therefore, the number of lines of code (or how they are defined) ceases to be important. They add bulk, not complexity.

All the items in a program where a break in flow occurs, explicitly or implicitly, is called a decision point.

Decision points occur when we encounter, for example,
1. A conditional statement
2. Head and tail of a loop statement
3. Subroutine/function call
4. Memory allocation/reallocation/deallocation
5. Aliasing of allocated memory
6. Goto, continue, break statements in C/C++ or equivalent statements in other languages
7. Switch, case, default statements in C/C++ or equivalent statements in other languages
8. Return statement in C/C++ or equivalent statement in other languages
9. Return of pointers which are not in the parameter list of the function returning the pointer
10. Within a loop body, a variable, which is redefined or modified after its first use within an iteration
11. Implicit mixed type operations in an expression or statement
12. Use of built-in operators in their overloaded incarnation by user-defined datatypes
13. The division operator where the denominator is not a constant
14. Communication calls
15. File operations
16. Nested operations The above-lists the most commonly encountered decision points. Others may be added as required by the situation in hand. The total number of decision points tells us the number of places in the code where we must look carefully. These are the potential stress points in a program.

Having identified the decision points, there is assigned to each an integer value indicative of what will be called herein a complexity index (CI) for that point. These values can be summed to provide an overall complexity index for a whole program or part of it. Alternatively or in addition, the distribution of decision points through the program can be analysed, e.g. by forming a complexity index histogram, so as to identify high complexity clusters.

BRIEF DESCRIPTION OF THE DRAWINGS

For a better understanding of the invention, reference will be made, by way of example, to the accompanying drawing, in which.

DETAILED DESCRIPTION

Figure 1:
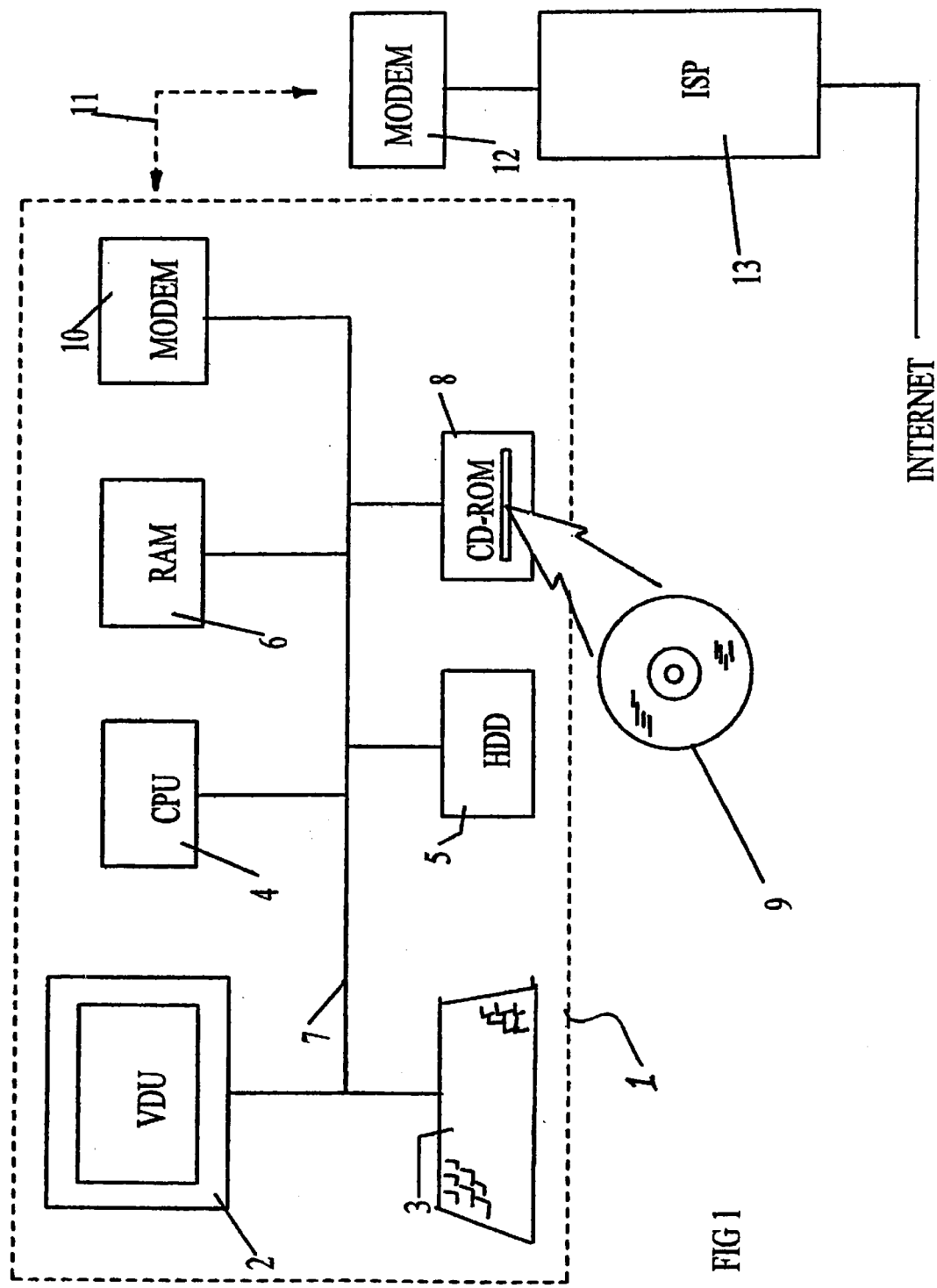
FIG. 1 is a simplified diagram of a computer system.

The present invention relates to the determination of the complexity index and complexity profile of a computer program or a part thereof. The present invention relates to a method and apparatus for carrying out such a determination, and also to a computer program product including a computer readable medium having recorded thereon a computer program for performing such determination.

FIG. 1 shows one embodiment of a computing environiment in which the present invention may be implemented.

This embodiment comprises a so-called stand alone computer 1, ie one which is not permanently linked to a network, including a display monitor 2, a keyboard 3, a microprocessor—based central processing unit 4, a hard-disc drive 5 and a random access memory 6 all coupled one to another by a connection bus 7. The keyboard 3 is operable for enabling the user to enter commands into the computer along with user data such as a search query. As well as keyboard 3, the computer may comprise a mouse or tracker ball (not shown) for entering user commands especially if the computer is controlled by an operating system with a graphical user interface.

To introduce program instructions into the computer 1, ie to load them into the memory 6 and/or store them on the disc drive 5 so that the computer begins to operate, and/or is made able to operate when commanded, in accordance with the present invention the computer 1 comprises a CD-ROM drive 8 for receiving a CD-ROM 9.

The program instructions are stored on the CD-ROM 9 from which they are read by the drive 8. However, as will be well understood by those skilled in the art, the instructions as read by the drive 8 may not be usable directly from the CD-ROM 9 but rather may be loaded into the memory 6 and stored in the hard disc drive 5 and used by the computer 1 from there. Also, the instructions may need to be decompressed from the CD-ROM using appropriate decompression software on the CD-ROM or in the memory 6 and may, in any case, be received and stored by the computer 1 in a sequence different to that in which they are stored on the CD-ROM.

In addition to the CD-ROM drive 8, or instead of it, any other suitable input means could be provided, for example a floppy-disc drive or a tape drive or a wireless communication device, such as an infra-red receiver (none of these devices being shown).

Finally, the computer 1 also comprises a telephone modem 10 through which the computer is able temporarily to link up to the Internet via telephone line 11, a modem 12 located at the premises of an Internet service provider (ISP), and the ISP's computer 13.

The computer 1 does not have to be in a stand alone environment. Instead, it could form part of a network (not shown) along with other computers to which it is connected on a permanent basis. It couldalsobe permanently coupled to or have a temporary link to a so-called Intranet, ie a group of data holding sites similar to Internet sites or URL's and arranged in the same way as the Internet but accessible only to particular users, for example the employees of a particular company. Instead of modem 10, the computer 1 could have a digital hard-wired link to the ISP's computer 13 or the computer 1 could itself comprise a permanently connected Internet site (URL) whether or not acting as an ISP for other remote users. In other words, instead of the invention being usable only through the local keyboard 3, it may be available to remote users working through temporary or permanent links to computer 1 acting as ISP or simply as an Internet site.

The program analysed could be software which has been entered into the computer via the keyboard 3, perhaps over a long period, and stored on the hard disc drive 5 or on another CD-ROM entered in the drive 8, assuming the drive and the other CD-ROM are capable of re-writing data to the CD-ROM, or on the aforementioned optional floppy disc or tape drive. The computer program could be available from say a file server (not shown) forming part of the aforementioned network, or from data holding sites within the Internet or the aforementioned Intranet.

The complexity index (CI) for any flow break (implicit or explicit) arising due to the predetermined conditions listed earlier (or those that may be added to it) is assigned a positive integer value as described later. Absence of complexity has the value 0. Thus a very large program comprising mainly simple blocks will have low complexity. On the other hand, a small program with many logical operators, function calls, etc will have high complexity. A less complex program will be easier to understand. The cumulative complexity index of the whole (or part of a) code is the sum of the individual complexity indices associated with the decision points within it. The individual indexes are assigned as follows.

1. Conditional statement. The complexity index of a conditional statement or expression is equal to the maximum number of conditions that may have to be evaluated during runtime in the statement or expression. If a condition can be statically evaluated during compilation, it is ignored. For example, the statement if (j>0 && k<10) { . . . };

where j and k cannot be determined statically, has a complexity index of 2 since both j>0 and k<10 conditions must be evaluated during runtime. On the other hand in the statements Cond=TRUE; if (Cond && k<10) { . . . };

the if statement has a complexity index of 1 since Cond is known to be TRUE at the compilation stage and therefore need not be evaluated during runtime.

2. Head and tail of a loop statement. The loop statement's head (and not the loop body) is given a complexity index of 1 if an implicit conditional evaluation is implied. For example, in do j=1,n

. . .

. . .

. . .

enddo in Fortran, the head has the implicit condition that the loop will be continued till j<=n. Likewise, the loop tail is given a complexity index of 1 because of the implicit condition that it will return to the loop head on reaching enddo.

The statement while (TRUE) { . . . } will have a complexity index of 1 due to the implicit continue at the tail (end of the while body), but since the while head (conditional part) has a fixed value TRUE, it's complexity index will be 0. On the other hand, the statement while (j>0 && k<2) { . . . } will have complexity index of 3-2 because the while head (conditional part) has two conditions to be evaluated during runtime, plus 1 for the implicit continue at the tail (end of the while body).

The complexity index of the loop body is evaluated as if it were independent of the loop, that is , it is treated as any other block of statements. Note specifically that the complexity index of a loop does not depend upon the number of loop iterations that may occur during runtime.

3. subroutine/function call. A subroutine/function call will have complexity index ( ) if the call is to a trusted subroutine/function, otherwise it will have the same complexity index as that of the subroutine/function. This way it makes no difference if the subroutine/function is inlined or not. For example, math library functions, such as sin ( ), cost ( ) may be considered as trusted functions because their behaviour is assumed to be known, predictable, and formally documented before release. In addition, each of the function's arguments in the function called may have their individual complexity index in a particular instance of the call. Consider, for example, the statement MyUntrustedFunction (arg1, ptr1=ptr2, C=A*B*A);

where arg1 is an integer variable, ptr1 and ptr2 are pointers of the same type to memory locations, C and B are objects of a user defined matrix class, and A is an integer variable. The call to the untrusted function MyUntrustedFunction( ) has complexity index of, say, 4. In addition, in this particular instance, ptr1=ptr2 has complexity index of 1 due to aliasing of allocated memory (because ptr1 and ptr2 refer to the same memory location, see 5 below), and C=A*B*A has complexity index of 6 because of two instances of overloading of the operator *, one instance of the overloading of the operator =, which we have assumed are not yet trusted operators (see 12 below), and three instances of implicitly mixed type operations (the operands of =, *, * in the statement have mixed types, see 11 below). Therefore, the complete statement has a complexity index of 4+1+6=11.

4. Memory allocation/reallocation/deallocation. Each instance of these operations is given a complexity index of 1.

5. Aliasing of allocated memory. Each such instance is given a complexity index of 1.

6. Goto, continue, break statements. Each of the keywords Goto, continue, break (or their equivalent) is given a complexity index of 1.

7. Switch, case, default statements. Each of the keywords switch, case, default (or their equivalent) is given a complexity index of 1.

8. Return statement. Each instance of the keyword return (or its equivalent) is given a complexity index of 1, except where it is the last statement of a subroutine/function, in which case its complexity index is 0. If the last statement of a subroutine/function is not a return, then this condition has a complexity index of 1.

9. Return of pointers which are not in the parameter list of the function. Such pointers in a return statement have complexity index of 1.

10. Within a loop body, a variable, which is redefined or modified after its first use within an iteration has the complexity index equal to the number of such redefinitions or modifications.

11. Implicit mixed type operations in an expression or statement. Each such occurrence within an expression or statement has complexity index of 1. Consider the statement

C=A*B*A;

where C and B are objects of a user defined matrix class, and A is an integer variable. Here the expression A*B*A has the operator * appearing twice and in each case their respective operands are of different types. These, therefore, provide a complexity index of 2 to the expression. If, in addition, the operator * is an untrusted overloaded operator (see 12 below) then the datatype of the final result of the expression may be in doubt and therefore the operator = may also end up with operands of differing types. We always err on the pessimistic side, so this will provide an additional complexity index of 1. The total complexity index of the statement is therefore 2+1=3.

12. Use of built-in operators in their overloaded incarnation by user-defined datatypes. Whenever an operator symbol is used to symbolize more than one operation, the operator is said to be overloaded. Most commonly this happens when different data types share the same operator symbol. For example, the symbol '+' (plus operator) is used in many datatypes, such as integers, vectors, matrices, etc to denote addition. However, in each case the details of the addition operation are different. In Boolean algebra, the plus operator is sometimes used to denote the 'OR' operation between logical variables. The compiler decides which operation is meant by looking at the operands involved in the operation. A set of operator symbols, such as '+', '_', '*', '/', etc which are reserved by a programming language for predefined operations on certain datatypes are called built-in operators.

The occurrence of each such operator in an expression or statement is to be treated as a subroutine/function call and its complexity index determined accordingly. Consider the statement

C=A*B*A;

where C and B are objects of a user defined matrix class, and A is an integer variable. Here the expression A*B*A uses the built in operator * twice and in each case the operator is overloaded by the matrix class. Likewise, the built in operator =is also overloaded by the matrix class. If the overloaded operators are trusted functions then the complexity index will be 0, else it will be 3.

13. The division operator where the denominator is not a constant. Each such occurrence within an expression has complexity index of 1 due to the potentiality of an inadvertent division by zero occurring during runtime.

14. Communication calls. In parallel programs, each communication function call (such as MPI function calls) is of complexity 1 because they all have the potential of breaking flow control. Note the exception made here: communication functions may generally be considered as trusted and hence would have been expected to carry a complexity index of 0. However, here the overriding concern is the possible break in flow control in one or more of the processors executing the program.

15. File operations. Each call to file operation (open, close, read, write, seek, etc) has complexity index of 1.

16. Nested operations. Nesting per se does not introduce complexity. However, deep nesting can cause perplexity! If the inner nested operations are viewed as if, in reality, they are calls to some hypothetical functions and these functions as having been programmed separately, then it becomes clear that nesting does not add to complexity. It helps to deal with nesting by going to the innermost nest and fanning out from there. Since the complexity is essentially a perceived one, it helps to format the code so that levels of nesting become apparent by inspection. An automated text formatting tool can be used to achieve this.

We shall call the distribution of complexity index in a piece of code as its complexity profile. One may represent the profile in a variety of ways. One such would be as a histogram where the horizontal axis has lines of code (as printed on paper or as displayed on the screen) and the vertical axis is the complexity index. A completely blank line or a comment line is not counted as a code line. The line must have at least one character in it, even if it is just a bracket, as long as the style of printing or displaying the code is consistently followed. So long as one follows a consistent style of writing and formatting a program, the profile would easily show the most interesting feature of a distribution such as clustering. Profiling is essentially an analysis of sequence and structure of decision making points within a program.

The complexity profile has some obvious uses. For example, wherever complexity indices cluster heavily, it may be worthwhile to (re)code those portions as separate functions. This will ease code development, testing and maintenance. Obviously, such functions should be coded by the best programmers. Another important use is in matching coders to coding assignments by putting highly skilled programmers to code portions having high density of complexity index and putting rookie programmers on portions having low density of complexity index.

New code development can begin after making an estimate of the total complexity index and building of complexity profile from the design. This should be done by a senior experienced programmer. The estimation process will give clear indications of the portions of the design where complexity indices are expected to be high during the code's development. Such portions should be entrusted to experienced programmers for coding. Furthermore, as indicated below, a project's progress can be monitored by measuring its current complexity index, and comparing it, for example, against an estimated base complexity index, and/or an acceptance complexity index. The new indices are defined below.

The estimated base complexity index is calculated from the design before coding commences. It can be viewed as an anticipated measure of the developmental effort required to build the program. The acceptance complexity index is calculated from acceptance CI=estimated base CI—CIs of program parts expected to be trustworthy at delivery As coding progresses, the current complexity index of the emerging program can be calculated (using the same trustworthiness considerations used in calculating the estimated base CI) and compared as a percentage with respect to the estimated base CI. This will provide a good measure of the progress of the project. At the end of the project it will also indicate how good or bad the original estimate was and the locations in the design that contributed to it by comparing the estimated complexity profile with the actual complexity profile. Serious mismatches between the estimates and actual realisation will indicate that the estimates were incorrectly (and probably, incompetently) made, or there were major modifications of the design after the estimates were made. The complexity index is therefore a powerful means of diagnosis, trouble-shooting and measurement in program development.

On the other hand, as testing progresses, portions of the new program will be found or made trustworthy. At any given time, for such trusted portions, we can notionally set their respective CI to 0 and calculate a complexity index. How close this index is to the acceptance CI may be used as a measure of how close one is to making a delivery. One may intuitively see that this index is a superior indicator of closeness to delivery than those in use in the software industry, such as coverage.

For code maintenance and testing, we begin with a code which compiles without errors. It is also assumed that all algorithmic and domain knowledge related considerations and choices have been made at the detailed design stage before coding is undertaken. If design ambiguities and/or errors are detected then they should be reported back to the designers. Coders should never be allowed to take ad hoc decisions or to second-guess or fill-in for domain experts to correct ambiguities and errors. The coders task is only to accurately map the design into code.

In maintenance and testing, the most important information is perhaps the complexity profile. For example, when a bug has been found and it is located in a part of the program where the CI density is high and the resolution of the bug is not obvious, it pays to put an experienced programmer to look at the bug. In regions of the code where the CI density is sparse, the code will be easier to understand. Precisely because of this, in such regions one must guard against complacency and check the code's logic carefully.

For project work load estimate, once the complexity index has been calculated, it can be weighted by empirical factors to account for the experience of the people taking up coding, maintenance and/or testing tasks. An individual can benchmark his/her weighting factor by taking a simple test every now and then. For maintenance and testing tasks, one may pick up an unfamiliar and uncommented program or a function with a complexity index of say 200–250 and determine the total time taken (including rest periods, when one deliberately tries not to think about the problem) to understand it, say, by drawing its flowchart. For coding tasks, take a design document which has an estimated complexity index of 200–250 and determine the total time taken to write the code for it (including rest periods, informal testing, etc). Divide the total time (measured in hours) by the complexity index to get the weighting factor.

Before submitting a project proposal to a client, each prospective programmer for the project can determine his/her weight factor, and the total (intellectual) work load, W, for the project can then be estimated from $$W = P \Sigma^{N}_{i=1} w_i p_i,$$

where N is the total number of programmers, P is the total complexity index, $w_i$ the i-th programmer's weight factor, and $p_i$ is the percentage of total complexity index P the i-th programmer will handle.

By assuming a specific number of working hours/week assignable work load per programmer, time to complete the project by the assigned team of programmers can be calculated. This does away with the need to carry out mass surveys to derive industry averages of programmer productivity and deal with the ground reality of needing to account for the productivity of assignable programmers.

For codes yet to be written, decision points and their respective complexity index can be estimated from designs, and from there the workload and staffing estimates can be made.

During a project an individual's $w_i$ is generally expected to improve. Hence estimates made on the basis of $w_i$ culled at the beginning of the project can be expected to be conservative.

Since an individual's $w_i$ is based on his/her ability to handle an unknown and uncommented code which is fairly complex, or based on the code the individual has produced from a design, the work load estimates will be much more reliable than currently used methods.

Examples of Complexity Index Calculation

The two functions, LU_Decom( ) and LU_Bksub( ), coded in C [adapted from Press, W H et al, Numerical Recipes in C, Second Edition, Cambridge University Press, 1992, pp 44–48], have been chosen to illustrated the ideas of decision points and complexity index. The codes, implement a widely used matrix algorithm, the LU decomposition, for solving simultaneous linear algebraic equations. The functions are small enough to be verifiable by visual inspection for correctness and therefore may be considered as trusted functions. However, to illustrate the complexity index calculation method we shall assume them to be untrustworthy!

In the two functions, the decision points have been underlined. The implicit tail condition in loops have been indicated by "//[impli. cont.]" wherever they are applicable. The functions NoMemory( ), fabs( ) and _Fatal( ) called by the two functions have been assumed to be trusted fuctions.

Example 1

```
double *LU_Decom(double *a, int n, int *idx, double *d)
    int i, iMax, j, k;
    double big , dummy, sum, temp;
    double *vv;
    vv = newdouble[n];
    if (!vv) NoMemory ();
    *d = 1.0;
    for(i = 0; i≤n; i++) {
        big = 0.0;
        for (j = 0; j≤n; j++) if ((temp=fabs(a[i*n+j]))>big)
                                   big = temp; // [impl.cont.]
        if (big==0.0)returnNULL; // If matrix is singular.
        vv[i] = 1.0/big
        // [impl.cont.]
    }
    for (j = 0; j≤n; j++) {
        for (i = 0; i≤j; i++) {
            sum = a[i*n+j];
            for (k = 0; k≤i; k++) sum-= a[i*n+k]*a[k*n+j];
            // [impl.cont.]
            a[i*n+j] = sum;
            // [impl.cont.]
        }
        big = 0.0;
        for(i = j; i≤n; i++) {
            sum = a[i*n+j];
            for (k = 0; k≤j; k++) sum-= a[i*n+k]*a[k*n+j]; // [impl.
            cont.]
            a[i*n+j] = sum;
            if((dummy=vv[i]*fabs(sum))>=big){
                big= dummy;
                iMax = i;
            }
            // [impl.cont.]
        }
        if(j != iMax) {
            for(k = 0; k≤n; k++) {
                dummy = a[iMax*n+k];
                a[iMax*n+k] = a[j*n+k];
                a[j*n+k] = dummy;
                // [impl.cont.]
            }
            *d= -(*d);
            vv[iMax] = vv [j];
        }
        idx[j] = iMax
        if (a[j*n+j]==0.0 _Fatal("Matrix is singular", "");
        if (j!=n-1){
            dummy = 1.0/ (a[j*n+j]);
            for (i = j+1; i≤n; i++) a[i*n+j] *= dummy; // [impl.cont.]
        }
    }
    delete[] vv;
    return a;
} // [CI = 39]
```

The complexity index is 39 in this example.

Example 2

```
double *LU_Bksub (double *a, int n, int *idx, double b[])
{
    int i, ii = -1, ip, j;
    double sum;
    for (i = 0; i≤n;i++) {
        ip = idx[i];
        sum = b[ip];
        b[ip] = b[i];
        if (ii+1)for (j = ii; j≤i; j++)
                    sum-= a[i*n+j]*b[j]; // [impl.cont]
        else if (sum) ii= i;
        b[i] = sum;
        // [impl.cont.]
    }
    for (i = n-1; i>=0; i--) {
        sum = b[i];
        for (j = i+1; j≤n; j++) sum-= a[i*n+j]*b[j]; // [impl.cont.]
        b[i]= sum/ a[i*n+i];
        // [impl.cont.]
    }
    return b;
} // [CI = 16]
```

The complexity index is 16 in this example.

In the above two examples each continuous underlined group of characters represents a decision point. Variables, which have been redefined within a loop body according to item 10 in Section 3 have been italicised and underlined. It so happens in the code above, that each decision point has a complexity index of 1. This need not have been so. For example, in the statement if ((dummy=vv[i]*fabs(sum))>=big) . . .

in LU_Decom( ), the complexity index would have been higher if fabs( ) had been an untrusted function. Note that a visual inspection of the underlined parts in the code provides an excellent feel for the complexity profile for each of the functions LU_Decom( ) and LU_Bksub( ). However, a more formal way of representing complexity profile, for example, would be to prepare a histogram.

It may be useful for code segments having (or developing during their creation) a high density of complexity index to be looked at by an experienced programmer and/or discussed with the designer to find semantically correct means of diffusing and attenuating the complexity index cluster, for example, by breaking a part or the whole of the cluster into one or more functions and having them developed separately. In addition, the best coders could be asked to develop functions which are currently untrustworthy and contributing heavily to the density of the cluster, into trustworthy ones. The ability to measure the complexity index of a code and its complexity at any time provides a means for knowing where the project stands and in controlling its progress. Most importantly, complexity index clusters provide a reliable means of identifying areas of code, which during development, testing and maintenance require expert help.

The embodiment of the invention described hereinabove does away with the need to define lines of code, function points, object points, etc because it does not depend upon them. The complexity index can be calculated or estimated at any stage of the program's development, and therefore it can be used to measure and control the program's progress during its development. Meanwhile, the size of the code is not a parameter in deciding the complexity of the program, work effort required to build, maintain or test the program, etc and domain knowledge is not a factor. This is not surprising since programming is a mathematical activity where what matters are axioms, symbolic systems and manipulation rules. In such a system complexity arises when choices have to be made, and the level of professional training needed to deal with the symbolic system. Therefore some professionals may produce a less complex system than another from the same design. However, given an explicit set of rules regarding how the complexity index is to be calculated for a given program, they should all arrive at the same complexity index from the program being indexed. Domain knowledge is critical in framing, and interpreting requirements, and in design. The mapping of a design into code, in principle, should be independent of domain knowledge, and hopefully in the future, the mapping can be automated.

For a program yet to be developed, its decision points can be rationally estimated from its corresponding design. Here different professionals may arrive at different estimates for the program but they should be able to agree on the number of decision points in the design. The different estimates will essentially indicate how different professionals, based on their experience, plan to map a design into a program, not whether one is superior over the other. For example, a high complexity index may well indicate that a lot of decision making capability has been crammed into a few lines of code and new (and possibly very efficient) datatypes or classes will be developed whose methods will, therefore, initially be untrusted.

It addresses the core issue that leads to complexity in code development, testing, and maintenance, and that is, the number of points in the code or design where some form of explicit or implicit decisions are being made which may need careful scrutiny. For example, if memory has been allocated, we need to be assured that it was actually allocated, and later, whether it is being properly deallocated, whether any aliases have been left dangling, and so on.

It does not depend on empirical data to be made available from third party sources but such data is generated within the project, on, for, and by the people who will actually work on the project and around the time they will work on the project. Such data can be revised easily and at short notice.

If reusable trusted functions are used, the complexity index automatically reduces. One does not have to account for it separately. Untrusted reusable functions do not reduce complexity. However, they often provide a false feeling of rapid progress in program development only to have problems surface later with uncanny tenacity during testing and maintenance.

Although the present invention has been described in terms of a preferred embodiment, it is not intended that the invention be limited to that embodiment. Modifications within the spirit of the invention will be apparent to those skilled in the art. The scope of the present invention is defined only by the claims that follow.

What is claimed is:

1. A method for determine the complexity of a computer program, the method comprising the steps of:

i) inspecting the program to identify occurrences therein of pre-determined program items that are indicative of breaks in the ongoing forward flow of the program, wherein said predetermined program items include any of: a conditional program statement; the head and tail of a loop statement; a call to a su-broutine or function; a memory allocation, reallocation or deallocation operation; aliasing of allocated memory; a statement including the keyword Goto, continue, break, switch, case, default and return, or an equivalent keyword; a pointer returned by a function not in the functions parameter list; a variable within a loop body if the variable is redefined or modified after its first use within a loop iteration; implicit mixed type operations in a statement or expression; division operators using non-constant denominators; a built-in operator which is overloaded by having been applied to a user-defined datatype; communication and file access calls; and nested operations and wherein said predetermined program elements exclude conditions that can be statically evaluated during compilation, constants, and trustworthy code;

ii) for each such predetermined program item indicative of breaks in the ongoing forward flow of the program assigning and recording a pre-determined numeric value to the item; and iii) summing the assigned numeric values to define a complexity index indicative of the complexity of the program.

2. A method according to claim 1, including the steps of forming a histogram from the said numeric values to define a complexity profile for the program.

3. A method according to claim 1, including carrying out the said steps (i) and (ii) in respect of the said program in the form of a design document to form a first set of said numeric values, and carrying out steps (i) and (ii) again whilst said program is partially encoded to form a second set of said numeric values; and comparing the first and second set of numeric values to determine the progress of the encoding.

4. A method for determining the complexity of a computer program, the method comprising loading the program into a computer and causing the computer to carry out the steps of:

(i) inspecting the program to identify occurrences therein of predetermined program items that are indicative of breaks in the ongoing forward flow of the program, wherein said predetermined program items include any of: a conditional program statement; the head and tail of a loop statement; a call to a sub-routine or function; a memory allocation, reallocation or deallocation operation; aliasing of allocated memory; a statement including the keyword Goto, continue, break, switch, case, default and return, or an equivalent keyword; a pointer returned by a function not in the functions parameter list; a variable within a loop body if the variable is redefined or modified after its first use within a loop iteration; implicit mixed type operations in a statement or expression; division operators using non-constant denominators; a built-in operator which is overloaded by having been applied to a user-defined datatype; communication and file access calls; and nested operations and wherein said predetermined program elements exclude conditions that can be statically evaluated during compilation, constants, and trustworthy code;

(ii) for each such item, assigning and recording a pre-determined numeric value to the item; and (iii) summing the assigned numeric values to define a complexity index indicative of the complexity of the program.

5. A method according to claim 4, including causing the computer to display a histogram indicative of the distribution of said numeric values throughout said program.

6. A method for analyzing computer software, the method comprising identifying occurrences in the software of pre-determined dynamic items indicative of breaks in the continuity of the forward flow of execution of the software and excluding conditions that can be statically evaluated during compilation, constants, and trustworty code; and indicating the distribution within the software of said predetermined dynamic items.

7. In a computer, a method for analyzing software loaded into the computer, the method comprising automatically inspecting the software to identify dynamic software statements therein which are indicative of breaks in the forward flow of the software when it is executed and excluding conditions that can be statically evaluated during compilation, constants, and trustworthy code and defining a complexity index indicative of the complexity of the software, based on the identified dynamic software statements.

8. A computer-readable medium embodying a set of instructions that, when executed by a computer, implements a computer software editor, the medium comprising: instructions for identifying and indicating within the software being read by the editor, occurrences in the software of pre-determined dynamic items indicative of breaks in the ongoing flow of the run time operation of the software while excluding conditions that can be statically evaluated during compilation, constants, and trustworthy code and instructions for defining a complexity index indicative of the complexity of the software, based on the identified occurrences of pre-determined dynamic items.

* * * * *